June 29, 1971  DAVID CHU  3,589,996
OPTICAL SURFACE GENERATING APPARATUS
Filed April 15, 1968  3 Sheets-Sheet 3
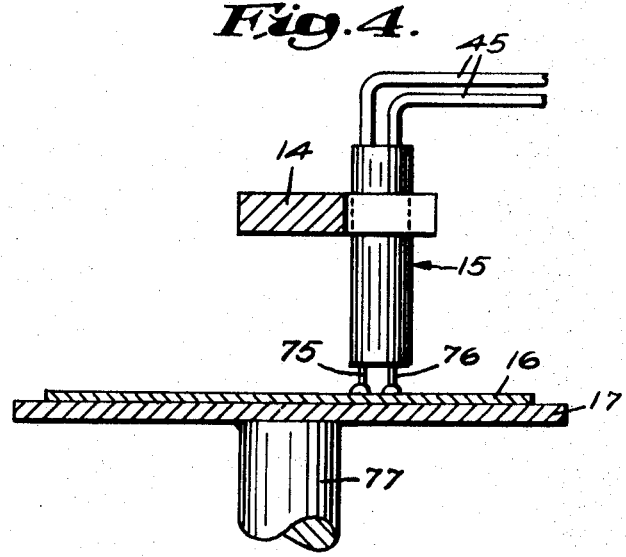
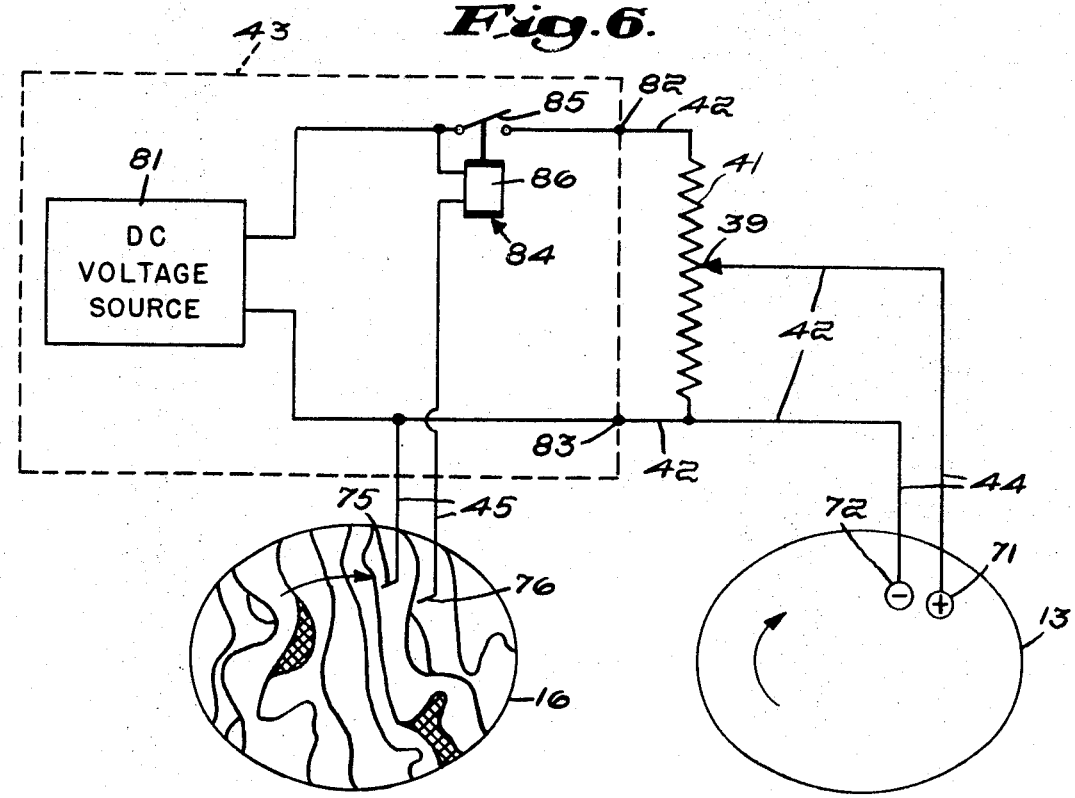
Inventor:
David Chu,
by John E. Toupal
Attorney

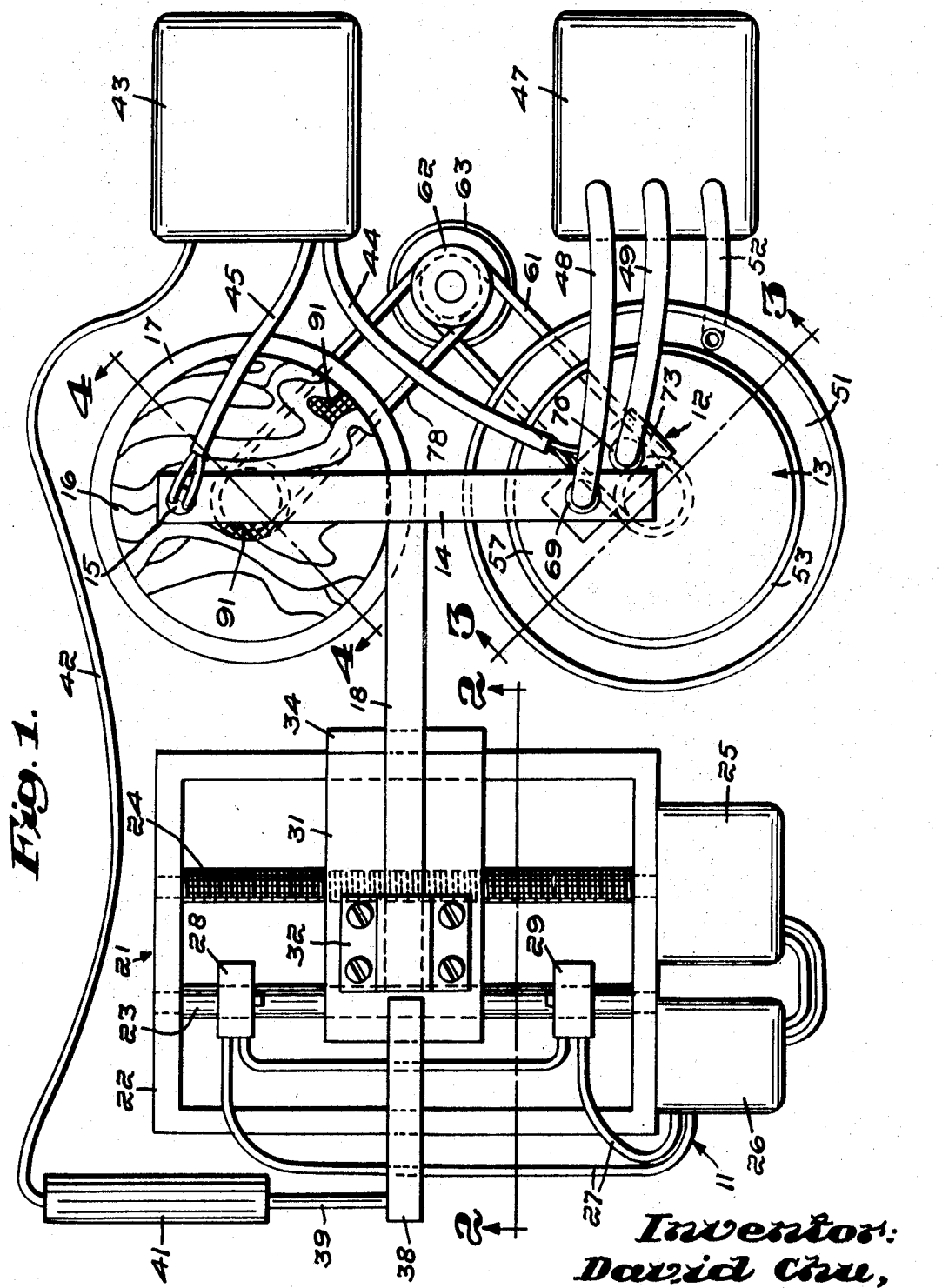

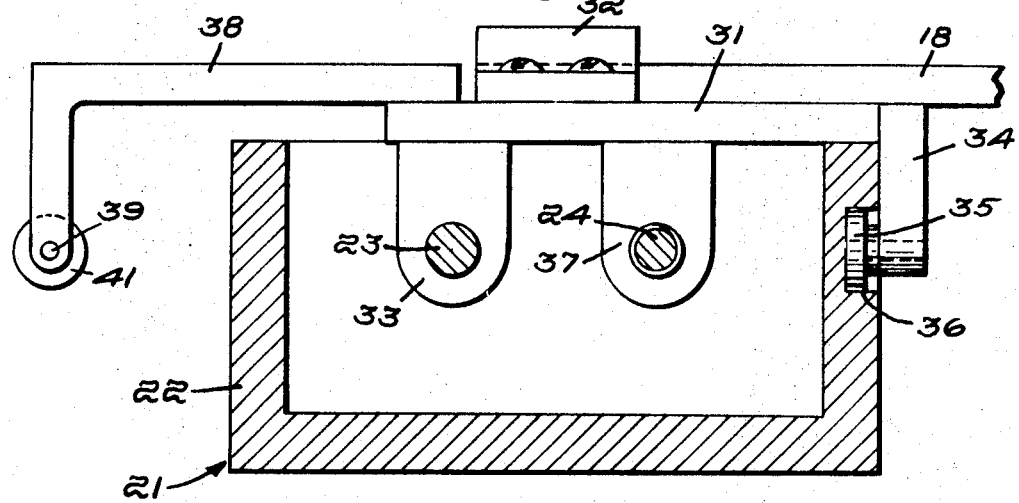
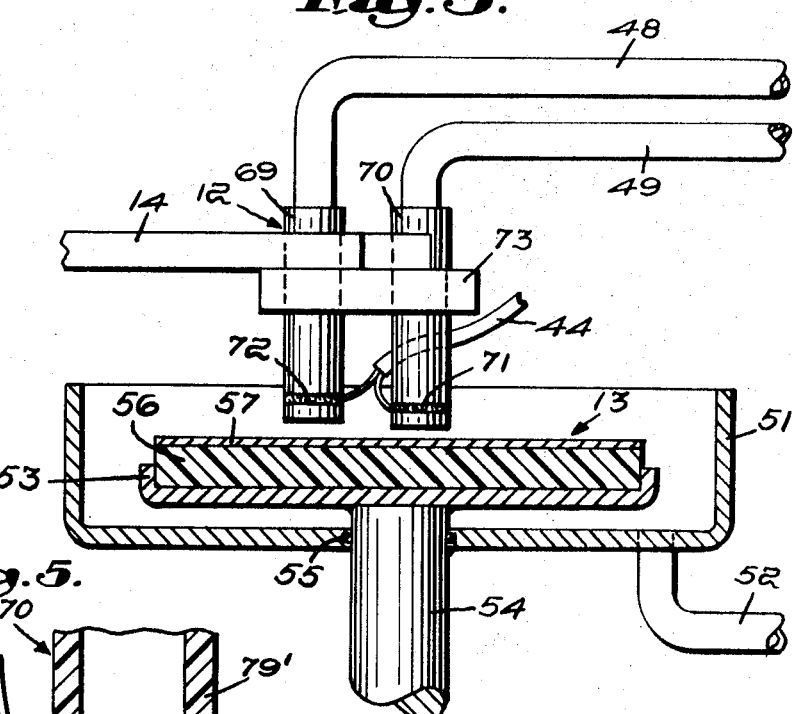
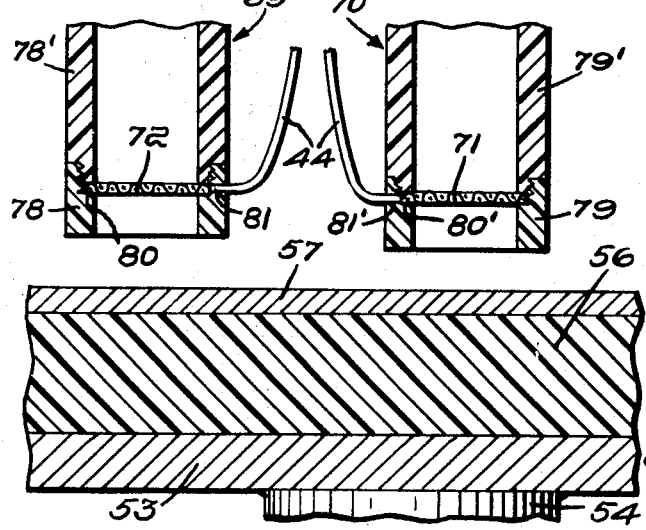

United States Patent Office

3,589,996
Patented June 29, 1971

3,589,996
OPTICAL SURFACE GENERATING APPARATUS
David Chu, Cambridge, Mass., assignor to
Itek Corporation, Lexington, Mass.
Filed Apr. 15, 1968, Ser. No. 721,470
Int. Cl. B23p 1/12
U.S. Cl. 204—224                    5 Claims

ABSTRACT OF THE DISCLOSURE

A surface generating system wherein continuous streams of electrolyte are circulated over platinum anode and cathode electrodes and onto the work surface of an optical blank. During movement over the work surface, the electrodes are selectively energized to produce electropolishing thereof without adverse effects of reaction plating or other factors that degrade surface quality.

BACKGROUND OF THE INVENTION

This invention relates generally to a method and apparatus for generating optical surfaces. More particularly, the invention relates to a method and apparatus for electropolishing the surfaces of optical blanks.

According to known methods, optical surfaces are normally ground and polished by utilizing completely empirically developed techniques. The practice of optical surface generation in accordance with these techniques suffers from a number of significant disadvantages including requirements for lengthy processing and for highly skilled technicians. Furthermore, since such empirically developed techniques are designed to produce symmetrical alteration of optical surfaces, they are generally inappropriate for eliminating asymmetrical deviations from a desired surface contour. This latter deficiency is particularly troublesome with regard to relatively large optical surfaces of, for example, 50-inch diameter and larger in which rotational asymmetries and random irregularities are more prominent than in smaller surfaces. Also known are so-called template grinding systems wherein a polishing tool is controlled by a guide having a surface configuration conforming to the surface contour desired for the optical blank. The surface quality produced with such systems is limited obviously by both the precision of the mechanical equipment used and the exactness of the guide itself. Furthermore, template systems are similarly unsuitable for correcting asymmetrical surface errors. Thus, a general need exists for improved optical surface generation systems and especially for generation systems capable of producing asymmetrical surface changes.

In a commonly assigned U.S. application Ser. No. 721,471 of Iwao P. Adachi entitled "Optical Surface Generating Method and Apparatus" filed concurrently with the present application, there is disclosed an electropolishing system suitable for eliminating asymmetrical imperfections in an optical surface. According to that system, a stream of electrolyte is continuously circulated over a cathode electrode and onto the conductively coated work surface of an adjacent optical blank. Electropolishing produced by the resultant electrochemical reaction is limited to that particular portion of the work surface directly impinged upon by the electrolyte stream. Accordingly, asymmetrical surface corrections are made by selectively energizing the cathode electrode while traversing it in a predetermined path over the work surface.

Some of the more perplexing problems encountered with the above described system resulted from phenomena produced by various types of anode electrode arrangements. One such problem was the reduction plating of anode material upon the work surface of the optical blank. Obviously, this undesirable depositing of foreign material is highly detrimental to the quality of the finished optical surface. Another problem was the variation in polishing rates that accompanied the use of an anode electrode fixed with respect to the work surface. The variable polishing rates were caused by changes in anode-cathode spacing that occurred during movement of the cathode electrode over the work surface. These changes altered the circuit impedance connecting the anode and cathode electrodes and, accordingly, varied both current flow and polishing rates. Obviously, such variations in polishing rates are undesirable in high quality optical surface generating systems.

Other problems were encountered during attempts to utilize sliding contacts that permitted relative movement between the work surface and the anode electrode. These sliding contact electrode arrangements tended to scratch the work surface and thereby diminish surface quality. Still other undesirable effects were produced by the use of anode electrodes separated from the conductive work surface and submerged therewith in a bath of electrolyte. Surface tarnishing was introduced with arrangements of this type.

The object of this invention, therefore, is to provide an electropolishing system capable of selectively generating high quality optical surfaces.

The invention is characterized by the provision of an optical surface generating system including an electrode support upon which are mounted anode and cathode electrodes, a blank support adapted to support an optical blank with an electrically conductive work surface perpendicularly adjacent to and spaced from the anode and cathode electrodes, an electrical power supply for producing an electrical potential between the anode and cathode electrodes, a drive mechanism for producing relative transverse movement between the work surface and the cathode electrode, and a fluid supply assembly for circulating electrolytic fluid over the anode and cathode electrodes and onto the adjacent work surface. Relative movement between the cathode electrode and the work surface permits selective polishing thereof by the circulating electrolyte which also provides the required electrical connection between the anode electrode and the work surface. In addition, the circulating electrolyte contacts utilized for both anode and cathode electrodes alleviate mechanical problems associated with maintaining electrical contact between the electrodes and the relatively movable work surface.

One feature of the invention is the provision of an optical surface generating system of the above type wherein the electrode support maintains a constant spacing between the anode and cathode electrodes. By maintaining a constant spacing between anode and cathode electrodes, a uniform rate of electropolishing can be sustained.

Another feature of this invention is the provision of an optical surface generating system of the above featured type wherein the anode and cathode electrodes are formed of platinum. The use of platinum as an electrode material alleviates undesirable reaction plating of electrode material upon the work surface of the optical blank.

Another feature of this invention is the provision of an optical surface generating system of the above featured type wherein the electrode support maintains a spacing between the cathode electrode and the work surface that is larger than the spacing between the anode electrode and the work surface. A limited anode electrode spacing prevents unwanted electropolishing reactions from occurring on the work surface portion adjacent the anode electrode while a larger cathode electrode spacing is helpful in maintaining a uniform rate of electropolishing on the work surface area adjacent thereto.

Another feature of this invention is the provision of an optical surface generating system of the above featured types wherein the electrode support and drive mechanisms maintain the anode electrode perpendicularly adjacent the work surface during all periods wherein the cathode electrode is perpendicularly adjacent thereto. This arrangement prevents polishing rate modifications that would occur upon interruption of the electrical connection between the anode electrode and the conductive work surface.

Another feature of this invention is the provision of an optical surface generating system of the above featured types wherein the fluid supply assembly includes an anode supply tube which circulates electrolytic fluid over the anode electrode for discharge onto the work surface and a cathode supply tube that circulates electrolytic fluid over the cathode electrode for discharge onto the work surface. The provision of distinct electrolytic fluid streams for each of the anode and cathode electrodes helps to isolate the electrochemical reactions occurring in the process and thereby improve process uniformity and controllability. In addition, the separate electrolytic fluid streams reduce the tendencies of the process to produce tarnishing of the optical blank's work surface.

Another feature of this invention is the provision of an optical surface generating system of the above featured types wherein the cathode and anode electrodes are mounted, respectively, within the cathode and anode supply tubes. Mounting of the electrodes within the fluid supply tubes allows discharge of highly collimated electrolytic fluid streams thereby enhancing the uniformity attainable with the process.

These and other characteristics and features of the present invention will become more apparent upon a perusal of the following specification taken in conjunction with the accompanying drawings wherein:

FIG. 1 is a schematic plan view of a preferred embodiment of the invention;

FIG. 2 is a cross-sectional view taken along the lines 2—2 of FIG. 1;

FIG. 3 is a cross-sectional view taken along the lines 3—3 of FIG. 1;

FIG. 4 is a cross-sectional view taken along the lines 4—4 of FIG. 1;

FIG. 5 is an enlarged view of the surface modifying assembly shown in FIG. 3; and FIG. 6 is a circuit diagram illustrating a control system for the surface generating embodiment shown in FIG. 1.

Referring now to FIG. 1 there is shown the optical surface polishing system 11 including the surface modifying assembly 12 mounted above the optical blank 13. Supporting assembly 12 is one end of the arm 14 having an opposite end supporting the sensor element 15. A guide mechanism including the contour map 16 and supporting turntable 17 are disposed below the sensor element 15.

The support bar 18 is connected between the mid-portion of the arm 14 and the drive assembly 21. Included in the drive assembly 21 is the housing 22 which supports the ball slide 23 and the worm shaft 24. Mounted on the housing 22 is the power supply 26 and associated motor 25 operatively coupled to the worm shaft 24. The electrical leads 27 connect the contact switches 28 and 29 with the power supply 26.

As shown in FIG. 2, the support bar 18 is secured to the transport table 31 by the mounting block 32. Supporting one end of the transport table 31 is the slide bearing 33 adapted for longitudinal movement along the ball slide 23. The opposite end of the transport table 31 is supported by the bracket 34 that terminates with rollers 35 that are retained by and adapted for movement within the groove 36 in the side wall of the housing 32. Internal threads on the collar 37 engage the worm drive 24 so as to produce movement of the transport table 31 in response to rotation thereof.

Secured to, for movement with the transport table 31 is the angle arm 38 having an end attached to the adjustment rod 39 of the voltage dividing potentiometer 41. The electrical cable 42 connects the potentiometer 41 to the power supply 43 which supplies electrical energy to the surface polishing assembly 12 through the electrical cable 44. Also connected to the power supply 43 by the electrical cable 45 is the sensor element 15.

The fluid supply unit 47 includes a supply tank and conventional fluid pump that circulates fluid through the supply tubes 48 and 49 for discharge by the polishing assembly 12. Fluid discharged by the assembly 12 contacts the optical blank 13 and is accumulated in the collecting vessel 51. A closed system is provided by the return tube 52 that conveys fluid back to the supply unit 47 from the collection vessel 51.

As shown more clearly in FIG. 3, the optical blank 13 is mounted on the support plate 53 within the collection vessel 51. Fixed for rotation with the plate 53 is the shaft 54 that extends through the fluid seal 55 in the bottom wall of the collection vessel 51. The optical blank 13 comprises the electrically non-conductive substrate 56 composed, for example, of optical glass or plastic and the deposited layer 57 of electrically conductive material. Rotation of the shaft 54 and plate 53 is produced by the belt 61 which is driven by the wheel 62 of the drive motor 63, as shown in FIG. 1.

Referring again to FIG. 3, the surface polishing assembly 12 includes the screen anode electrode 71 disposed within the rigid terminal portion 70 of the fluid supply tube 49 and the screen cathode electrode 72 disposed within the rigid terminal portion 69 of fluid supply tube 48. The anode and cathode electrodes 71 and 72 and the fluid supply tubes 48 and 49 are supported by the mounting plate 73 secured to one end of the arm member 14. Electrical energy is supplied to the anode and cathode electrodes 71 and 72 from the power supply 43 by leads included in the electrical cable 44.

As shown in FIG. 4, the sensor element 15 comprises the spaced apart brush electrodes 75 and 76 mounted for movement along the surface of the contour map 16. The electrodes 75 and 76 are connected to the power supply 43 by the electrical leads 45. Supporting the turntable 17 is the shaft 77 which also is driven by the drive wheel 62 (FIG. 1) via belt 78. Thus, the contour map 16 and the optical blank 13 are synchronously driven at equal rotational speeds by the drive motor 63.

As shown more clearly in FIG. 5, the cathode tube 69 includes a lower tube portion 78 threadedly engaged with an upper tube portion 78'. Similarly, the anode tube 70 includes a lower tube portion 79 threadedly engaged with an upper tube portion 79'. Each of the lower tube portions 78 and 79 possess annular seats 80 and 80' that retain, respectively, the circular cathode screen electrode 72 and the anode screen electrode 71. Also formed in the lower tube portions 78 and 79 are, respectively, the apertures 81 and 81' that accommodate the electrical leads 44. The apertures 81 and 81' are preferably sealed with a suitable potting material after connection of the leads 44 with the electrodes 71 and 72.

The control circuit for the surface modification system 11 is illustrated in FIG. 6. As shown, the power supply 43 includes the DC voltage source 81 that excites a DC potential between output terminals 82 and 83. Also included in the power supply 43 is the relay 84 having the normally open switch contact 85 connected between the voltage source 81 and positive output terminal 82. The winding 86 of the relay 84 is connected in series with the brush contacts 75 and 76 directly across the DC voltage source 81. Coupled across the output terminals 82 and 83 is the rectilinear potentiometer 41, the output of which is connected to the anode and cathode electrodes 71 and 72 of the surface polishing assembly 12.

During operation of the system 11, the fluid supply unit 47 is actuated to produce a continuous flow of an electrolyte through the fluid supply tubes 48 and 49.

Suitable electrolytes include, for example, nickelous sulphate solutions or potassium nitrate solution. The continuously pumped electrolyte flows over the anode and cathode electrodes 71 and 72 and is discharged as a stream onto the conductive coating 57 of the optical blank 13. After excitation of the electrodes 71 and 72 by the power supply 43, the discharging streams of electrolyte function both as electrodes and as ion exchange media. Accordingly, electrolytic polishing action occurs on that area of the coating 57 directly below the cathode electrode 72.

The disassociation of ions from the surface coating 57 produced by the electrolytic action results in a gradual displacement of material therefrom. The rate and type of material removal effected are influenced by various factors including the power output of the power supply 43, the kind of electrolyte used, the spacings of the electrodes 71 and 72 from the surface 57, etc. In a preferred embodiment, the electrodes 71 and 72 are excited by one microsecond pulses that produce momentary densities of 5–15 amperes per square foot. This output establishes a satisfactory rate of surface polishing without completely dissolving the film layer 57. The pulsed signal can be established in the power supply 43, for example, by a conventional current interrupter such as a vibrator.

Because electrical contact is provided by the circulating electrolyte streams, relative movement between the electrodes 71 and 72 and the work surface 57 is maintained without the mechanical problems associated with fixed connections. Furthermore, by forming the electrodes 71 and 72 of platinum, the novel assembly 12 provides surface polishing under the cathode electrode 72 without the occurrence of any reaction plating of material under the anode electrode 71. Thus, degradation of optical quality by either mechanical marring or electrochemical reaction plating is eliminated. A still further advantage is provided by the electrode support 73 which maintans the anode and cathode electrodes 71 and 72 at a constant spacing during the polishing process. Because of this constant spacing, the impedance of the electrical circuit is maintained constant and an extremely uniform rate of polishing can be maintained.

A precise electrochemical analysis of the system is quite complex since current is passing through four different metal-electrolyte interfaces, namely the interface between the cathode electrode 72 and the cathode electrolyte stream, the interfaces between conductive layer 57 and both the cathode electrolyte stream and the anode electrolyte stream, and the interface between the anode electrode 71 and the anode electrolyte stream. The existence of four interfaces gives rise to four different electrode reactions with oxidation occurring at the interfaces between the cathode electrolyte stream and the surface 57 and between the anode electrode 71 and the anode electrolyte stream, and reduction occurring at the interfaces between the cathode electrode 72 and the cathode electrolyte stream and between the anode electrolyte stream and the surface 57. Although, as noted, a precsie electrochemical analysis is rather difficult, it is believed that evolution of $H_2$ is the predominant reduction reaction occurring at the interfaces between the electrolyte streams and both the anode and cathode electrodes 71 and 72 and that the evolution of $O_2$ is the predominant reaction occurring at the interface between the anode electrolyte stream and the conductive surface 57. The oxidation reaction at the interface between the cathode stream and the surface 57 is even more difficult to determine and may comprise the formation of either $Cr^{+2}$, $Cr^{+3}$ or $Cr_2O_7$. In any case, a clearly observable displacement of surface material 57 occurs at this interface while no reaction plating is apparent on any of the interfaces.

In a preferred embodiment of the invention, the spacing between the anode electrode 71 and the surface 57 is less than the fixed spacing between the cathode electrode 72 and the surface 57. A limited anode electrode spacing prevents unwanted electropolishing from occurring on the work surface 57 area directly adjacent the anode electrode 71 while a larger cathode spacing is helpful in maintaining a uniform rate of electropolishing on the work surface 57 area adjacent thereto. Also preferred is the illustrated arrangement wherein the cathode and anode electrodes 72 and 71 are mounted within, respectively, the cathode and anode supply tubes 69 and 70. Mounting of the electrodes 71 and 72 within the tubes 69 and 70 allows discharge of highly collimated electrolytic fluid streams thereby enhancing the uniformity attainable with the process. It will also be noted that during movement of the assembly 12, the anode electrode 71 is always maintained over the conductive surface 57. For this reason the electropolishing action under the cathode electrode 72 is never interrupted by movement of the anode electrode 71 into a position not perpendicularly related to the surface 57.

Relative movement between the surface modifying assembly 12 and the optical blank 13 is introduced by energizing both the drive motor 63 and the drive assembly 21. Rotation of support plate 53 produces a circumferential component of relative movement between the surface 57 and the cathode electrode 72. Simultaneously, rotation of the turntable 17 preduces a synchronized circumferential component of relative movement between the contour map 16 and the sensor element 15. As described further below, this later movement controls the excitation of the electrodes 71 and 72 and thereby the surface modification produced by the polishing assembly 12. Additional, radially directed components of relative movement btween the cathode electrode 72 and the optical surface 57 and between the sensor element 15 and the contour map guide 16 are produced by reciprocal movement of the transport table 31 as follows: Responsive to energization of the motor 25, the rotating worm 24 drives the operatively engaged transport table 31 in a reciprocating movement between the contact switches 28 and 29. Upon each contact between the table 31 and either of the switch contacts 28 and 29, the motor power supply 26 is activated in a conventional manner to reverse the rotational direction of the drive motor 25. Thus, the transport table 31 is driven in a reciprocating motion between the switch contacts 28 and 29. Consequently, the integrally connected cathode electrode 72 and the sensor element 15 are synchronously driven in reciprocating radially disposed paths above, respectively, the optical surface 57 and the contour map 16. Because of the two components of relative movement, the cathode electrode 72 and the sensor element 15 pass over all surface portions of, respectively, the optical surface 57 and the contour map 16. Furthermore, because both the rotational movements of the optical blank 13 and the contour map 16 and the reciprocating movements of the sensor element 16 and the cathode electrode 72 are in synchronism, the relative position of the sensor element 15 above the contour map 16 is always directly related to the relative position of the cathode electrode above the optical surface, 57.

During its movement relative to the optical surface 57, the sensor element 15 periodically passes over sensitized contour map regions 91. According to a preferred method a layer of electrically conductive copper is applied to sensitize the regions 91. Thus, when the brush electrodes 75 and 76 of the sensor element 15 contact a sensitized region 91 a conductive path is established through the relay winding 86 as illustrated in FIG. 5. This closes switch contacts 85 and results in the application of source voltage across the anode and cathode electrodes 71 and 72. Consequently, the surface modifying assembly 12 is activated to produce surface polishing. Conversely, when the brush electrodes 75 and 76 are in contact with non-sensitized regions of the contour map 16, the relay winding 86 is deenergized, switch contacts 85 remain open and the surface polishing assembly 12 is de-activated. It will be obvious, therefore, that selective polishing of the optical surface 57 can be achieved by sensitizing predetermined portions of the contour map 16. A preferred method for selectively polishing the surface 57 in this manner is described in the above identified U.S. application of Iwao P. Adachi.

Obviously, many modifications and variations of the present invention are possible in light of the above teachings. For example, control systems other than those shown and described can be used to control movement of the surface modifying assembly 12. Other suitable control methods and systems are disclosed, for example, in the commonly assigned, copending U.S. application Ser. No. 719,657 of Ronald Aspden entitled "Optical Surface Generating Method and Apparatus," filed Apr. 8, 1968. It is to be understood, therefore, that within the scope of the appended claims the invention can be practiced otherwise than as specifically described.

What is claimed is:
1. Surface generating apparatus comprising:
   means for supporting a workpiece;
   means for supporting an anode electrode and a cathode electrode above an electrically conductive work surface of said workpiece, said electrode support means including mounting means for maintaining a substantially constant spacing between said anode and cathode electrodes and for maintaining a spacing between said cathode electrode and said work surface that is larger than the spacing between said anode electrode and said work surface;
   drive means for producing relative transverse movement between said electrodes and said work surface;
   power supply means for producing an electrical potential between said anode and cathode electrodes; and
   fluid supply means for circulating an electrolyte adjacent said anode and cathode electrode and onto said work surface.
2. Surface generating apparatus according to claim 1 wherein said electrode support means and said drive means maintain said anode electrode perpendicularly adjacent said work surface during all periods wherein said cathode electrode is perpendicularly adjacent said work surface.

3. Optical surface generating apparatus comprising:
   support means for supporting an optical blank having an electrically conductive work surface;
   support means for supporting anode fluid supply tube means and cathode fluid supply tube means above said work surface for circulating, separate, independent electrolytic fluid streams over said work surface;
   means for mounting an anode electrode and a cathode electrode within said anode and cathode fluid supply tube means, respectively, and in the path of said electrolytic fluid streams;
   power supply means for producing an electrical potential between said anode and cathode electrodes; and,
   drive means for producing relative transverse movement between said work surface and said anode and cathode fluid supply tube means together with their associated anode and cathode electrodes.
4. Optical surface generating apparatus according to claim 3 wherein said electrodes comprise screen electrodes.
5. Optical surface generating apparatus according to claim 3 wherein said electrode support means includes means for maintaining a spacing between said cathode electrode and said work surface which is larger than the spacing between said anode electrode and said work surface.

References Cited
UNITED STATES PATENTS

| | | | |
|---|---|---|---|
| 2,848,410 | 8/1958 | Knuth-Winterfeld et al. | 204—40.5 |
| 3,293,316 | 12/1966 | Sullivan | 204—224 |
| 3,338,807 | 8/1967 | Clifford | 204—143 |
| 3,466,235 | 9/1969 | Williams | 204—143 |
| 3,474,013 | 10/1969 | Inoue | 204—143 |

JOHN S. MACK, Primary Examiner

S. S. KANTER, Assistant Examiner

U.S. Cl. X.R.

204—140.5, 143